March 24, 1953 J. W. GRATIAN 2,632,816

MAGNETIC RECORDING AND REPRODUCING HEAD

Filed March 26, 1951

INVENTOR.
JOSEPH W. GRATIAN
BY T. L. Bowes
ATTORNEY

Patented Mar. 24, 1953

2,632,816

UNITED STATES PATENT OFFICE 2,632,816

MAGNETIC RECORDING AND REPRODUCING HEAD

Joseph W. Gratian, Rochester, N. Y., assignor to Stromberg-Carlson Company, a corporation of New York Application March 26, 1951, Serial No. 217,646

4 Claims. (Cl. 179—100.2)

This invention relates to magnetic recording and reproducing heads and more particularly to such heads having a spacer in the gap between the conventional pole pieces.

As is well known in the art, the high frequency response obtained from magnetic reproducing heads is limited by the gap length. The response theoretically falls to zero at that frequency at which the wavelength of the recorded signal equals an integral multiple of gap length. It has also been found that when the gap is made too short, such a large percentage of the flux from the recording is shunted through the gap that a reduction of the flux linking the pickup coil results and, consequently, there is a reduction in output voltage. Furthermore, it has been found that the magnitude of this shunting effect is a function of the recorded signal wavelength and causes a poorer relative high frequency response as well as low output at all frequencies.

The use of spacers to separate the pole pieces of a magnetic core structure has been proposed heretofore as a means for enabling accurate spacing of the pole pieces or tips. It has been found that physically soft spacer materials tend to become imbedded with magnetic material carried over from the laminations of the core structure and that the effective gap length and resulting frequency response varies erratically with wear and use. A spacer made from a physically hard material, on the other hand, appears to keep the edges of the gap sheared clean and provides reasonably consistent results. However, when tapered pole pieces are used, in connection with hard spacers, to reduce the aforementioned shunting effect, the gap itself increases as the surface of the core wears away. On the other hand, if, in connection with a hard material spacer, a uniformly long gap is provided, the aforementioned shunting effect is encountered.

It is an object of my invention to provide a new and improved head for use in magnetic recording systems, in which a spacer of physically hard material is used to provide clean, well-defined gap edges without the foregoing disadvantages.

Another object of my invention is to provide a new and improved magnetic head for magnetic recording and reproducing systems having a minimum effective gap at the point of contact with the recording medium but maximum reluctance between the pole faces as is requried for optimum performance.

Still another object of my invention is to provide a magnetic head with a self-maintaining gap.

Figure 2:
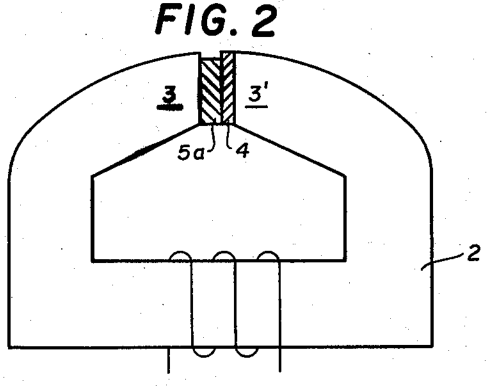
Figure 3:
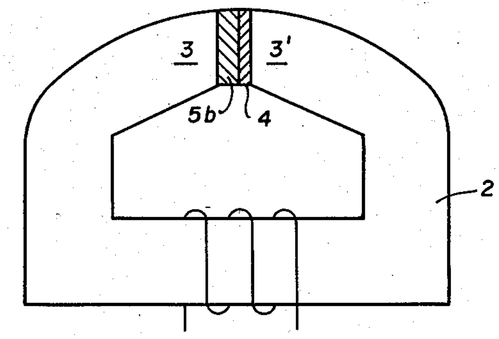

The features of my invention which I believe to be novel are set forth with particularity in the appended claims. My invention itself, both as to its organization and manner of operation, together with further objects and advantages thereof, may best be understood with reference to the following description taken in connection with the accompanying drawing in which Fig. 1 represents a magnetic head made in accordance with the principles of my invention and Figs. 2 and 3 illustrate alternative steps in the assembly of the head of Fig. 1.

In the drawing, there is shown a magnetic head 1 having a core 2 of suitable magnetic material any suitable shape. The core is shaped to provide two pole pieces or tips 3 and 3', the pole tips defining a gap extending across the upper surface of the core. In the gap or in other words in the space between pole tips 3 and 3' there is provided a pair of spacers 4 and 5, spacer 4 being made from a relatively thin physically hard non-magnetic material such as beryllium copper of 0.25 mil thickness and spacer 5 being formed from a relatively thick physically soft non-magnetic material such as aluminum or soft solder for example, of about 1.0 mil thickness.

Figure 1:
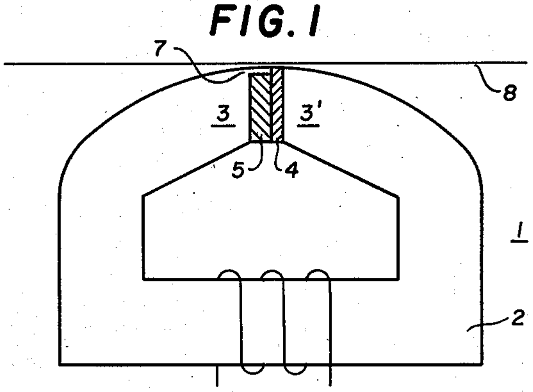

As best seen in Fig. 1, pole tip 3 is provided with a lip 7 extending across the upper end of spacer 5 into engagement with the edge of spacer 4, whereby the adjacent end of spacer 4 defines the gap across which the signal carrying medium indicated by the numeral 8 may be moved.

The lip 7 may be formed by wearing in the magnetic recording head with the recording medium or with an abrasive wire or strip. Another method of forming the lip 7 is to roll or burnish the lip with a suitable tool.

In Fig. 2 there is illustrated an embodiment of my invention in which spacer 5*a* is made shorter than pole tip 3 and spacer 4, and the material of tip 3 is rolled or burnished or worn in, for example, to the extent that the space between tip 3 and spacer 4 is filled up with material from tip 3 to form lip 7. Alternatively, spacer 5*b* may be initially the same height as tip 3 and spacer 4, but material is caused to be worn off of tip 3 and embedded in the soft material of spacer 5*b* until a suitable lip 7 is built up.

With any of the foregoing arrangements, the advantages of a hard spacer are combined with the advantages of a tapered pole tip to provide minimum shunting of flux through the gap as the head wears, the lip 7 continually renews itself automatically and the gap across the hard spacer is maintained.

This type of construction is advantageous for recording as well as reproducing heads in which case an increased flux density, at the point of contact between gap and recording medium, with a given M. M. F. may be expected.

While I have shown a particular embodiment of my invention, modifications and other embodiments will occur to those skilled in the art. For example, the spacers may be of any desired thickness relative to each other and of a wide variety of materials. I, therefore, do not desire my invention to be limited to the particular construction shown and described, and I intend in the appended claims to cover all modifications within the spirit and scope of my invention.

What I claim is:

1. A head for use in magnetic recording systems comprising a core of magnetic material having a pair of pole tips defining a gap extending across a surface thereof, a pair of spacers in said gap, one of said spacers comprising a physically hard non-magnetic material, the other of said spacers comprising a relatively soft non-magnetic material, and a thin lip of magnetic material extending across the end of said other spacer at said surface.

2. A head for use in magnetic recording systems comprising a core of magnetic material having a pair of pole tips defining a gap extending across a surface thereof, a pair of spacers in said gap, one of said spacers being relatively thin and comprising a physically hard non-magnetic material, the other of said spacers being relatively thick and comprising a relatively soft non-magnetic material, said one spacer and said pole tips extending to said surface, said other spacer terminating below said surface, and a thin lip of magnetic material extending across the end of said other spacer between said core and said one spacer.

3. A head for use in magnetic recording systems comprising a core of magnetic material having a pair of pole tips defining a gap extending across a surface thereof, a pair of spacers in said gap, one of said spacers being relatively thin and comprising a physically hard non-magnetic material, the other of said spacers being relatively thick and comprising a relatively soft non-magnetic material, said one spacer and one of said pole tips extending beyond said other spacer, thereby providing a recess at said surface, the resulting recess between said one spacer and the pole tip adjacent said other spacer being filled with magnetic material.

4. A head for use in magnetic recording systems comprising a core of magnetic material having a pair of pole tips defining a gap extending across a surface thereof, a pair of spacers in said gap, one of said spacers being relatively thin and comprising a physically hard non-magnetic material, the other of said spacers being relatively thick and comprising a relatively soft non-magnetic material, said core having a thin lip of magnetic material extending across the end of said other spacer at said surface into engagement with said one spacer whereby the end of said one spacer defines a gap across which a signal carrying medium may be moved.

JOSEPH W. GRATIAN.

REFERENCES CITED

The following references are of record in the file of this patent:

FOREIGN PATENTS

| Number | Country | Date |
|---|---|---|
| 429,987 | Great Britain | June 11, 1935 |